US008510090B2

(12) United States Patent
Hesse et al.

(10) Patent No.: US 8,510,090 B2
(45) Date of Patent: Aug. 13, 2013

(54) CONDITIONING DEVICE FOR ENERGY SUPPLY NETWORKS

(75) Inventors: Ralf Hesse, Wernigerode (DE); Hans-Peter Beck, Goslar (DE); Dirk Turschner, Bad Grund (DE)

(73) Assignee: Technische Universitaet Clausthal, Clausthal-Zellerfeld (DE)

( * ) Notice: Subject to any disclaimer, the term of this patent is extended or adjusted under 35 U.S.C. 154(b) by 641 days.

(21) Appl. No.: 12/443,880

(22) PCT Filed: Oct. 9, 2007

(86) PCT No.: PCT/IB2007/004721
§ 371 (c)(1), (2), (4) Date: Mar. 12, 2010

(87) PCT Pub. No.: WO2009/022198
PCT Pub. Date: Feb. 19, 2009

(65) Prior Publication Data
US 2010/0256970 A1    Oct. 7, 2010

(30) Foreign Application Priority Data
Oct. 6, 2006    (DE) .......................... 10 2006 047 792

(51) Int. Cl.
*G06F 17/50* (2006.01)
(52) U.S. Cl.
USPC .......................................................... 703/13
(58) Field of Classification Search
USPC .......................................................... 703/13
See application file for complete search history.

(56) References Cited

U.S. PATENT DOCUMENTS

| 5,798,633 A | * | 8/1998 | Larsen et al. | ............... 323/207 |
| 2006/0268587 A1 | * | 11/2006 | Veenstra | ....................... 363/37 |

FOREIGN PATENT DOCUMENTS

| DE | 2 155 586 | 11/1971 |
| DE | 2006012828 | * 10/2006 |

OTHER PUBLICATIONS

Beck et al.:Virtual Synchronous Machine; from proceedings 9$^{th}$ Int Conf Electrical Power Quality and Utilization, Barcelona; Oct. 2007; pp. 1-6.*
Schmidt, Prof. Dr.-Ing. Jurgen, Elektrizitat abseits der Stromnetze. (Electricity beyond the electricity networks), Erneuerbare Energien (Renewalbe Energies), Dec. 2003, pp. 53-55.

(Continued)

*Primary Examiner* — Hugh Jones
(74) *Attorney, Agent, or Firm* — Whitham Curtis Christofferson & Cook, PC

(57) ABSTRACT

A conditioning device is described for power supply networks (2) having a network voltage measurement unit (3) which can be connected to a three-phase power supply network (2), having a computation unit (1) which is connected to the network voltage measurement unit (3) and is used to determine conditioning current values (K) and having an inverter unit (4) which is connected to the power supply network (2) and is used to feed in conditioning currents ($I_K$) as a function of the determined conditioning current values (K). The computation unit (1) is designed for modeled simulation of a synchronous machine in order to determine at least one component of the conditioning current values (K) as stator currents of the simulated synchronous machine as a function of freely variable synchronous machine parameters, using the network voltages ($U_N$), measured in three phases, of the power supply network (2) as input variables. In addition, compensation currents are fed into the network (2) via the inverter (4), and are determined by the algorithms for harmonic current compensation (7) and unbalance compensation (8).

6 Claims, 6 Drawing Sheets

(56) References Cited

OTHER PUBLICATIONS

Matthias, Hauck, et al., Control of a Three Phase Inverter Feeding an Unbalanced Load and Operating in Parallel with Other Power Sources, Elektrotechnisches Institut, Universitat Kalsruhe, 2002, pp. 1-10. As sited on p. 2 of the specification.

Marx, Prof. Dr.-Ing. Dr. h.c. C., et al.,Elektronische Synchronmaschine mit aktivem Dampferkreis zur Energiekonditionierung in elektrischen Versorgungssystemen, Clausthal-Zellerfeld, Papierflieger, 2000, pp. 1-211.

* cited by examiner

CONDITIONING DEVICE FOR ENERGY SUPPLY NETWORKS

The invention relates to a conditioning device for power supply networks having a network voltage measurement unit which can be connected to a three-phase power supply network, having a computation unit which is connected to the network voltage measurement unit and is used to generate conditioning current values and having an inverter unit which is connected to the power supply network and is used to feed in conditioning currents as a function of the conditioning current values into the power supply network.

The number of energy generators, which are installed in a distributed manner, in the lower and medium power range, with this number increasing in the course of the creation of regenerative energy sources, represents a problem in terms of their integration into existing power supply networks, because of the fluctuating amount of power they generate. Discrepancies result because of the stochastic nature of the power that is fed in together with the consumer power supply requirements, which are based on continuity and quality, and these discrepancies necessitate conditioning measurements at suitable network nodes. In particular, as the decentralization of the feed structure of the power supply networks increases and as regenerative generators are included, the influence of the generator technology of the traditional large power stations, which is governed by the synchronous machine, decreases, although this influence is significant for network stability and for the quality of the electrical power supply to the consumers. The generation redistribution in favor of regenerative sources is therefore resulting in a deficit of the oscillation-damping and stabilizing influence of synchronous machines. Furthermore, the increased use of non-linear consumers is leading to a harmonic load in the power supply networks, which has an adverse effect on the network quality and is additionally causing losses and aging as a result of the thermal influence in the network equipment. Other problems include oscillation effects in power supply networks with increased use of electrical machines, voltage dips resulting from there being too little short-circuit power in situ and, associated with this, also an increased effect of network harmonics, which are caused mainly by non-linear loads, and the network unbalance resulting from unbalanced loads.

A control method for automatic synchronization of converters using variable-frequency inverters is described in J. Schmid, P. Strauβ: "Elektrizität abseits der Stromnetze" [Electricity beyond the electricity networks], in: Erneuerbare Energien [Renewable energies] December 2003, pages 53 to 55. Rotating generators can be operated without any problems in parallel on a composite network because of the relationship between the frequency-rotating generators and the power. The resultant variable-frequency operation allows synchronization without additional communication or synchronization devices. In the steady state, the frequency is the same. The power output can be limited as a function of the network frequency by the use of variable-frequency inverters. A continuous power supply and network stability are ensured by a combination of battery inverters and battery stores.

A control concept for a self-commutated converter which supplies power to an electrical network and can be operated in conjunction with other voltage sources is disclosed in Hauck, M.: "Bildung eines drei-phasigen Inselnetzes durch unabhängige Wechselrichter im Parallelbetrieb" [Formation of a three-phase island network by independent inverters operated in parallel], Karlsruhe University Thesis 2002. It has been found that parallel operation of a battery inverter with a controlled synchronous machine is possible without communication, and that the voltage quality can be improved in this way.

An energy conditioner for a power supply network, which has a battery and a converter for network connection, is described in Beck, H.-P., Clemens, M.: "Konditionierung elektrischer Energien in dezentralen Netzabschnitten" [Conditioning of electrical powers in decentralized network sections], in: etz, issue May 2004, pages 16 to 25. The power conditioner is a three-phase voltage source, whose fundamental magnitude and phase angle can be adjusted.

Power conditioning of power supply networks using an electronic synchronous machine with an active damper circuit is described in Wenske, J.: "Elektronische Synchronmaschine mit aktivem Dämpferkreis zur Energiekonditionierung in elektrischen Versorgungssystem" [Electronic synchronous machine with an active damper circuit for power conditioning in an electrical supply system], Clausthal TU Thesis 1999. The primary side, secondary side and tertiary side (active damper circuit) of a synchronous machine are simulated by means of electronic power components in order to make it possible to preset and regulate the power and wattless component on the network. The state-regulated voltage and power regulator in the form of a network support point does not, however, behave dynamically in the same way as an electromechanical synchronous machine. Only the capability to preset set values for the power and wattless-component regulator leads to four-quadrant power/wattless-component operation which is comparable with the static behavior of an electromechanical synchronous machine in the wider sense. For this purpose, the synchronous machine is simulated using a very simple equivalent circuit comprising a controllable-voltage and controllable-frequency voltage source, a coupling reactance and a connected network. No remote power call by the power supply network is supported, which means that the power levels required at any given time must be preset as local set values, possibly via a separate communication link. The rotor side of the electronic synchronous machine is formed by a pulse-controlled inverter together with a smoothing inductance and a delta-connected secondary winding. A primary winding on the high-voltage side with a star point that is passed out and a capacitor bank forms the primary side or the stator of the synchronous machine. The active damper circuit of the synchronous machine is formed by a tertiary winding, which is likewise connected in delta, in conjunction with a filter inductance and a converter clocked at high speed.

Against this background, the object of the present invention is to provide a better conditioning device for power supply networks which makes it possible to exploit the entire dynamic and steady-state behavior of an electromechanical synchronous machine by its simulation on the network.

The object is achieved by the conditioning device of the type mentioned initially in that the computation unit is designed for modeled simulation of an electromechanical synchronous machine in order to determine at least one component of the conditioning current values as stator currents of the simulated synchronous machine as a function of freely variable synchronous machine parameters, using the network voltages, measured in three phases, of the power supply network as input variables.

As a result of the computer-aided simulation of a synchronous machine and the network feed of the synchronous machine currents, which are calculated on this basis, using electronic power devices, it is possible to freely configure these items for objective conditioning and to achieve a better network situation overall, when conditioning currents are fed into the power supply network as a function of the determined conditioning current values.

The simulation of the synchronous machine with the aid of the computation unit makes it possible to exploit both dynamic and steady-state characteristics of a conventional electromechanical synchronous machine on the network. The computation unit uses the simulation and compensation algorithms to determine a conditioning current value signal. By way of example, the conditioning current values can then be supplied to the power supply network, via the highly dynamic compensation inverter, by impression of the calculated conditioning currents. The conditioning current values comprise at least the calculated stator currents of the simulated synchronous machine and may optionally also include the harmonic and unbalance compensation current values which are additionally determined by the computation unit.

The modeled simulation of the synchronous machine has the advantage of free definition of the parameters of the synchronous machine simulation, in such a way that it is possible to adapt the behavior of the synchronous machines, for example with regard to damping and reaction to transient processes, to the respective circumstances in the connected power supply network and to the behavior of the loads in the power supply network.

The conditioning process can easily be carried out, without a further communication link, by measuring the network voltage in the power supply network and by using this as an input variable for the simulation of the synchronous machine. As in the case of a real rotating synchronous machine, without any slip, the simulation includes the assumption that the simulated rotation speed of the synchronous machine being simulated by calculation is rigidly related to the network frequency in the steady state, but that oscillations can occur which correspond to the simulated rotor.

The computation unit is preferably designed to simulate the synchronous machine with the aid of a linear differential equation system with a freely configurable matrix in order to describe the impedances of the machine, the flux coupling between the stator, exciter and damper, and the typical time constants of the simulated synchronous machine. The electrical characteristics of the synchronous machine are thus predetermined by the linear factors of the differential equation, and these factors are used to determine stator currents for the network feed, as a function of the measured network voltages.

The real-time calculation of the synchronous machine model in the computation unit also leads to a rotating mass becoming effective on the network, since the described differential equation system also takes account of the exact simulation of the mechanical behavior of a synchronous machine, whose calculated electrical effects influence the network directly. The DC voltage store of the inverter in this case corresponds, in terms of energy, to the simulated, virtual mechanical system. The oscillating and steady-state mechanical energies of the rotor of an electromechanical synchronous machine correspond to oscillating and steady-state electrical energies on the DC voltage store of the virtual synchronous machine.

If, in the case of an electromechanical synchronous machine, the shaft has a motor or generator torque applied to it and power is correspondingly fed to or taken from the network, a virtual moment can be preset for the computation unit in the simulation of the synchronous machine according to the invention, by which means power is taken from the network in the case of a motor torque, and is supplied to the DC voltage source of the inverter while, in contrast, power is taken from the DC voltage store and is supplied to the network in the case of a generator torque.

As in the case of an electromechanical synchronous machine, power and wattless component can be demanded remotely by the network in the described concept as well. If the network dynamically varies its frequency for this purpose, power is demanded, while if the network changes the voltage, wattless component is demanded. Together with any given DC voltage source on the DC voltage store, the synchronous machine simulation together with the inverter on the network behaves like a conventional power station, thus simplifying network integration and operation on the network.

In particular, the invention makes it possible for regenerative low-power and medium-power generators which are installed in a distributed manner to act like conventional power stations on the network, to stabilize the network at the same time, and additionally to improve the network quality by means of harmonic compensation and unbalance compensation. From the network point of view, the generators which are included in this way appear in the same way as synchronous machines, thus allowing proven and reliable network operation.

The complete simulation of a conventional electromechanical synchronous machine also takes account of the mass inertia of its rotor in such a way that the characteristics which result from the effect of the virtual rotating mass can be provided for the power supply network.

The identical dynamic response of an electromechanical synchronous machine and of the machine simulation furthermore has the advantage that damper power which occurs, for example as a result of undesirable network oscillations, is no longer converted to unusable heat in the damper circuit, as in the case of electromechanical synchronous machines, but, in the case of the concept according to the invention, is supplied to the DC voltage store of the inverter. The energetic substance of the oscillation which adversely influences the network is thus removed from the network and can be made usable again by storage.

The computation unit is preferably furthermore designed to determine network voltage harmonics of the measured voltage and to generate harmonic conditioning current values in order to compensate for the determined network voltage harmonics, with components of the conditioning currents which correspond to the harmonic conditioning current values being fed back into the power supply network.

In a corresponding manner, the computation unit is also designed to determine network voltage unbalances of the measured network voltage and to generate unbalance conditioning current values in order to compensate for the determined network voltage unbalances, with components of the conditioning currents which correspond to the unbalance conditioning current values being fed back into the power supply network.

The network quality of the power supply network can be further improved by this additional harmonic and unbalance compensation. In particular, it is possible to compensate for harmonics in the three-phase network and unbalances in the three phases of the power supply network. This is possible since the calculated stator currents of the synchronous machine simulation can be superimposed on the compensation currents for harmonic and unbalance compensation in order to form a common conditioning current.

A DC voltage source is preferably provided which is connected to an inverter, and is connected via a coupling inductance or a coupling transformer to the power supply network. This allows four-quadrant power operation. The inverter is driven by the conditioning current values in order to carry out power conditioning, including harmonic and unbalance compensation, in the power supply network.

The conditioning device makes it possible to reduce the tendency to oscillate and to increase the short-circuit power of electrical power supply networks. Further stabilization of the power supply network can be achieved with the aid of the simulated rotating masses.

The operational reliability can be improved by oscillation damping and by increasing the short-circuit power throughout the network, by the interaction of a plurality of control devices with a simulated synchronous machine in distributed network operation.

The invention will be explained in more detail in the following text with reference, by way of example, to the attached drawings, in which.

Figure 1:
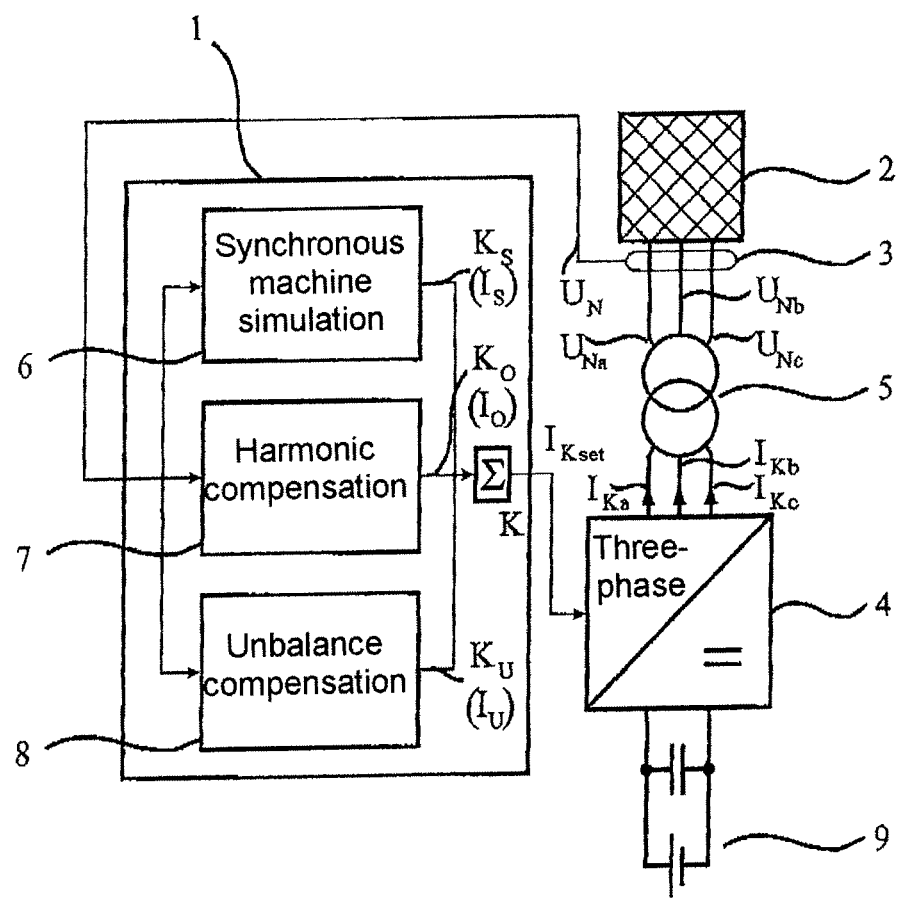
FIG. 1 shows a block diagram of a conditioning device for power supply networks.

FIG. 1 shows a block diagram of the conditioning device according to the invention for power supply networks 2. A network voltage measurement unit 3 is used to measure the network voltage $U_N$ in the power supply network 2. In this case, the network voltages $U_{Na}$, $U_{Nb}$, $U_{Nc}$ of all three phases of the three-phase power supply network 2 are determined continuously and are supplied as input variables to a computation unit 1. As a function of the measured network voltage $U_N$, the computation unit 1 determines conditioning current values K which comprise calculated synchronous machine stator currents and harmonic as well as unbalance compensation currents, in order to generate conditioning currents $I_{Ka}$, $I_{Kb}$, $I_{Kc}$ for all three phases, which are fed into the power supply network 2 with the aid of a highly dynamic inverter 4 with a coupling transformer 5 or a coupling inductance. The network voltage measurement unit 3, computation unit 1 and inverter 4 components jointly behave like a conventional electromechanical synchronous machine on the power supply network 2. The DC voltage side of the inverter contains the source or the store 9.

The conditioning device essentially has a computation unit 1 in order to simulate a synchronous machine with the aid of a freely configurable model and in order to determine conditioning current values K, as a function of the measured network voltage $U_N$, which conditioning current values K would result in the conditions of the selected parameters in a synchronous machine. The computation unit 1 has a synchronous machine simulation algorithm 6 for this purpose.

In addition, the computation unit 1 has modular functional units for harmonic compensation 7 and unbalance compensation 8. The conditioning current value signal K is determined as a network feed current set value signal with the aid of the algorithms for synchronous machine simulation and for harmonic and unbalance compensation and is supplied to the highly dynamic inverter 4 for feeding the calculated synchronous machine stator and compensation currents $I_{Kset}$ into the power supply network 2. The response of the synchronous machine, for example with regard to damping and reaction to transient processes, can be matched to the respective circumstances in the connected power supply network 2 and/or to the behavior of the loads in the power supply network 2 by means of the free definition of the parameters in the synchronous machine simulation 6.

Those components of the conditioning currents $I_Q$ and $I_U$ which are determined for harmonic and unbalance compensation can be superimposed on the components of the conditioning currents $I_{Kset}$ determined by the synchronous machine simulation.

The complete simulation of the synchronous machine allows the conditioning device also to be included in the conventional power transfer and wattless-component transfer in the network system on the basis of P-f (power/frequency) and Q-U (wattless-component/voltage) droop function. A capacitive wattless component for a network assistance can be drawn by reduction of the network voltage $U_N$, by influencing the synchronous machine simulation algorithm 6. If, in contrast, the network frequency falls as an indicator of network limit loading, power is automatically transmitted from the conditioning system to the power supply network 2. When the synchronous machine simulation algorithm 6 is in the free machine mode, then power is transferred on the basis of the natural characteristic, with superimposition of primary control (regulated machine mode) on the basis of the linear P-f/Q-U droop function. The required power is kept available in a DC voltage source 9 which is connected to the inverter 4. Power and wattless component which is required in the power supply network 2 can also be obtained locally in the synchronous machine simulation algorithm 6 by presetting a virtual rotor angle and/or by varying the virtual excitation. The electrical power which is supplied to or taken from the network when a rotor angle is preset is not supplied or taken from the shaft as in the case of a conventional electromechanical synchronous machine, but is supplied to or taken from the DC voltage store 9 via the inverter 4.

The computation unit 1 additionally analyzes voltage harmonics and voltage unbalances in the power supply network 2 and provides appropriate compensation current values $K_O$ and $K_U$ as a component of the conditioning current values $K_{set}$. These are superimposed as secondary and tertiary set-value currents on the primary set-value currents of the simulation of the synchronous machine, with their effect being staggered, and are supplied as an overall set value $I_{Kset}$ to the inverter 4.

The inverter modulation is carried out using a highly dynamic hysteresis method, which directly processes the composed compensation current set-value signal $K_{set}$ and thus allows this to act directly on the power supply network 2, by feeding it in.

Figure 2:
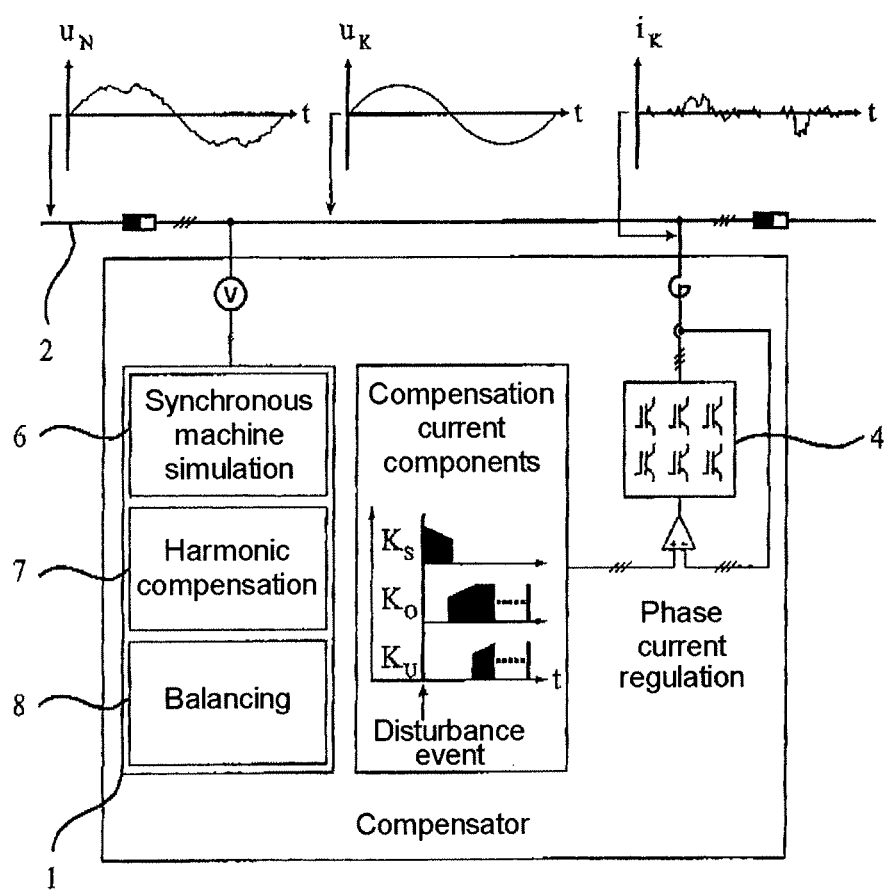
FIG. 2 shows a sketch of the effect range, and the network area which is therefore protected, of the connected conditioning device and network-voltage profiles and conditioning-current profiles.

FIG. 2 shows a diagram of the conditioning device with network voltage profiles and compensation current profiles. The adversely affected network voltage $U_N$ is measured, and is supplied by the computation unit 1. Over time, conditioning current values $K_S$ are provided with the aid of the synchronous machine simulation 6, harmonic compensation current values $K_O$ for harmonic compensation and unbalance compensation current values $K_U$ in order to balance the network voltage. Disturbance events are compensated for over time as a function of these conditioning current values K, in that these are fed into the network area to be conditioned, via a phase current regulator and a highly dynamic inverter 4.

Figure 3:
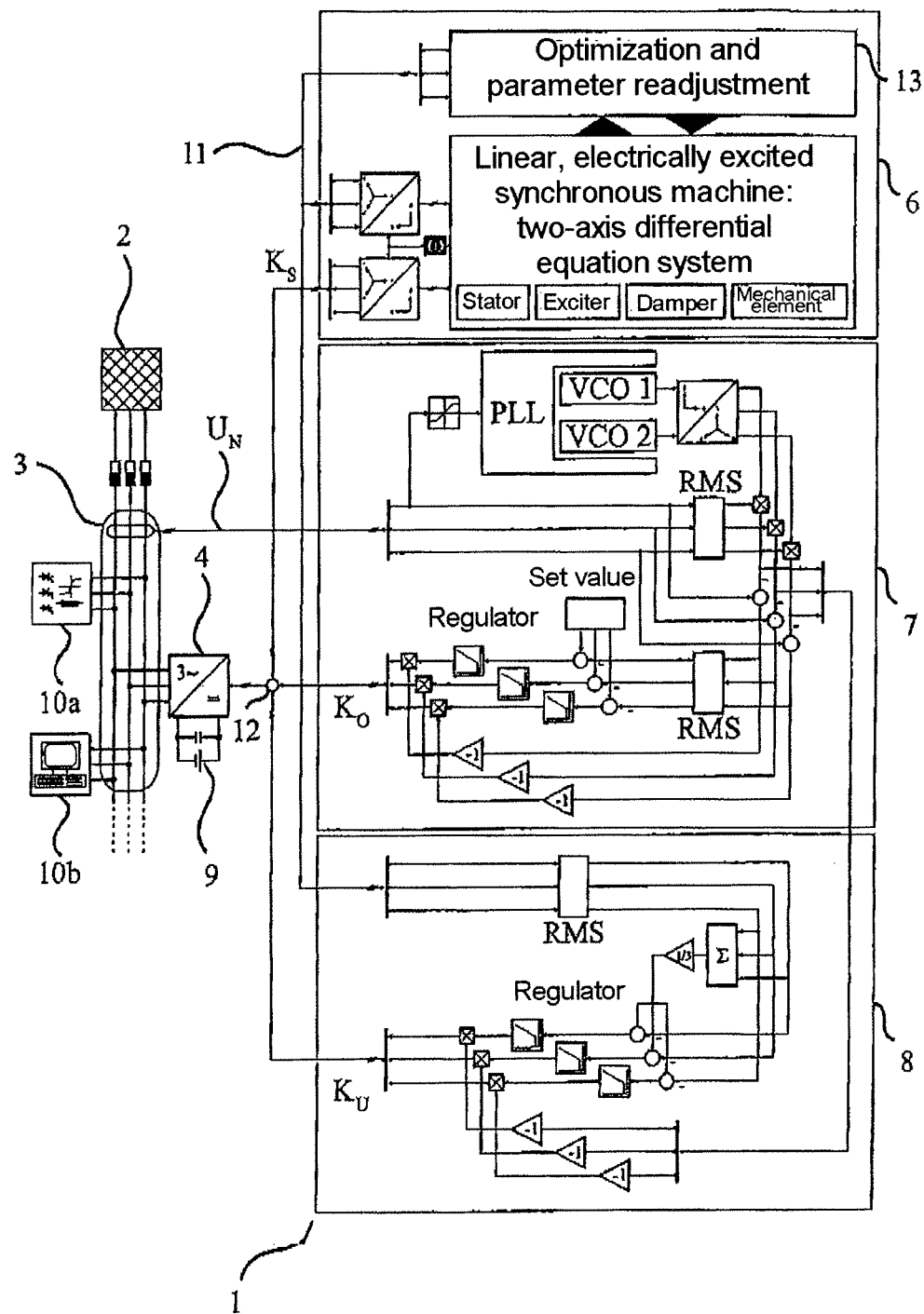
FIG. 3 shows a diagram of the detailed design of one embodiment of the conditioning device with the components for simulation of the synchronous machine and for harmonic and unbalance compensation.

FIG. 3 shows a diagram of the detailed design of the conditioning device, which is connected to a loaded power supply network 2. By way of example, network-quality-loaded loads 10a, 10b are connected in the operating area of the conditioning device. The power quality of the power supply network 2 is improved in the operating area of the conditioning device in that the calculated conditioning current values K are fed, as corresponding conditioning current values $I_K$, into the power supply network 2 via the inverter 4.

The component for synchronous machine simulation 6 includes a forward-transformation of the network voltage 11, which is subsequently interpreted by the synchronous machine simulation as a stator voltage, in order to calculate the stator currents of a virtual electromechanical synchronous machine with electrical excitation and squirrel-cage damper winding, with the aid of a model, from the measured three-phase network voltage $U_N$. The three-phase network voltage $U_N$ is also supplied to a unit 11 for network observation, in order to take account of the instantaneous network load situation with the aid of optimization algorithms and machine parameter readjustment. For this purpose, the freely definable linear factors of the differential equation system of the synchronous machine are continually adapted at time intervals of a few minutes. The differential equation system of the synchronous machine simulation describes a two-axis model of the magnetically linear, electrically excited synchronous machine and takes account of all the electrical and magnetic variables of the stator, exciter and damper in the illustration, based on the d-q coordinate system. In addition to the freely configurable impedances of the stator, exciter and damper, including the flux-coupling matrix, the model contains a mechanical system, which is likewise configurable, for simulation of the rotating mass of the machine rotor as well as the required transformation to represent the network voltage in d-q form and for feeding back the d-q stator currents, calculated using the two-axis model, into three-phase stator currents in order to transfer the machine stator current values to the inverter 4 for feeding into the power supply network 2.

Furthermore, as can be seen, the algorithm for harmonic compensation 7 and the algorithm for unbalance compensation 8 respectively produce the compensation*current value signals $K_O(t)$ and $K_U(t)$ over time t as a function of the measured three-phase network voltages $U_N$, which signals are superimposed on one another in an adder 12 with the calculated machine stator current signal from the machine simulation in order to produce a resultant conditioning current signal K(t) over time t, which is supplied as a set value to the inverter 4 in order to produce an overall conditioning current profile $I_K(t)$ as a set value.

(*$K_S$: current signal of the synchronous machine simulation (machine current), $K_O$: current signal of the harmonic compensation device (harmonic compensation current), $K_U$: current signal of the unbalance compensation device (unbalance compensation current)

Machine current+harmonic compensation current+
unbalance compensation current=conditioning
current)

Figure 4:
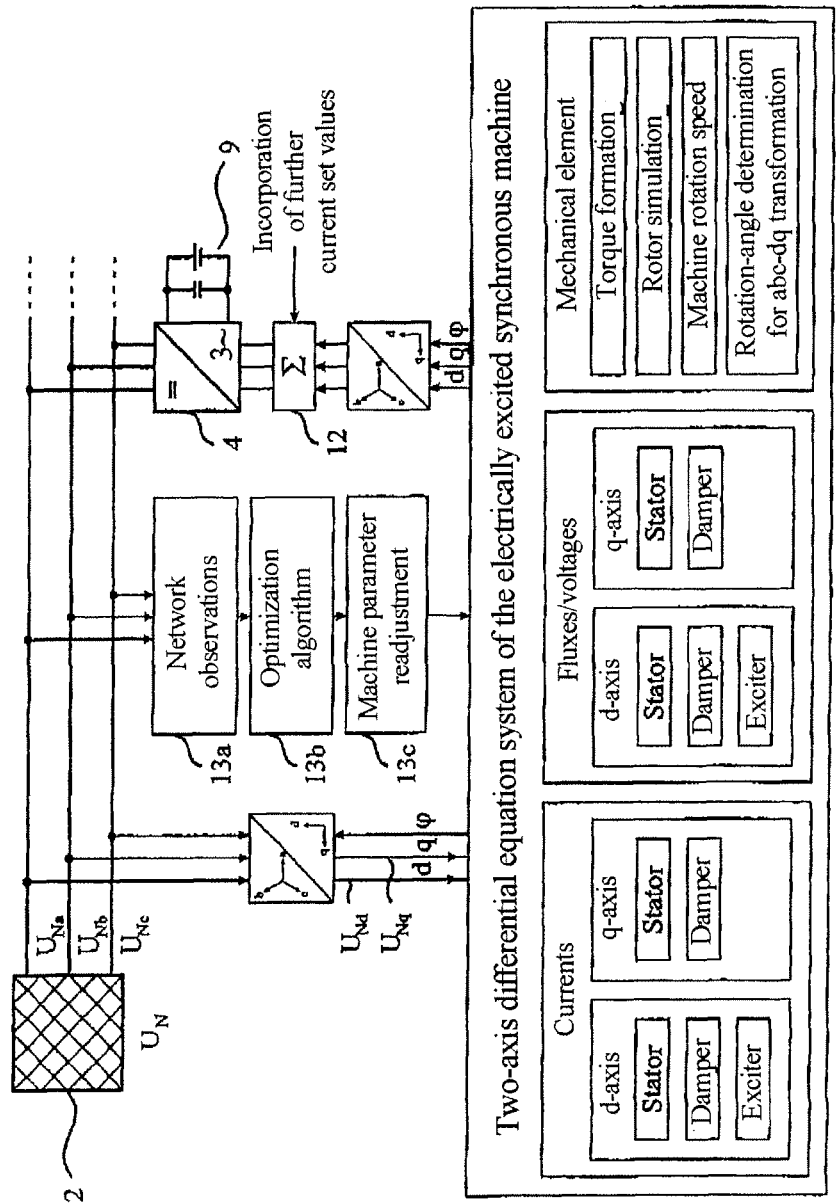
FIG. 4 shows a block diagram of the functional units for simulation of the synchronous machine.

FIG. 4 shows a block diagram of the detailed design of the algorithm for synchronous machine simulation 6. The algorithm contains a differential equation system, which is worked out in real time in the computation unit, in order to describe the behavior of a synchronous machine on the basis of a two-axis model. The stator currents are calculated from the network voltage $U_N$ in d-q coordinates of a virtual electromechanical synchronous machine with electrical excitation and squirrel-cage damper winding. The two-axis model of the synchronous machine contains all the impedances and flux linkages of the stator, exciter and damper of a machine such as this, and determines all its electrical, magnetic and mechanical variables in real time.

In addition to the freely configurable linear factors of the differential equation system, the model contains a likewise configurable mechanical system for simulation of the rotating mass of the machine rotor, as well as the required transformation to represent the network voltage in d-q form and for feeding back the d-q stator currents, which are calculated by the two-axis model, into three-phase stator currents for set-value transfer to the inverter 4, for feeding into the power supply network 2.

The computation unit 1 processes the network voltage $U_N$, which comprises the three phases $U_{Na}$, $U_{Nb}$ and $U_{Nc}$, in a differential equation system which corresponds to the electromechanical synchronous machine. For this purpose, a forward-transformation of the stator voltage $U_N$ is first of all carried out to the components $U_{Nd}$ and $U_{Nq}$ with the assistance of the transformation angle $\phi$, which is derived from the rotation of the virtual rotor as calculated in the differential equation system.

The differential equation system is used to calculate the machine stator currents in d-q coordinates from the network voltage in d-q coordinates, taking account of the magnetic couplings, which are typical of the electromechanical synchronous machine, of the impedances in the stator, exciter and damper. The stator, exciter and damper are magnetically coupled to one another on the d-axis. Since the excitation acts only on the d-axis, only the stator and damper are coupled to one another on the q-axis. The d-axis and q-axis are magnetically decoupled from one another because they are mutually perpendicular.

In order to allow the calculated stator currents to be fed into the power supply network 2 via the inverter, they must previously have been transformed back from the d-q representation to the abc representation. Once again, this is done with the assistance of the transformation angle $\phi$.

The differential equation system of the synchronous machine also takes account of the torque formation, the rotor simulation, the machine rotation speed and the rotation-angle determination for the coordinate transformation of the electrical machine variables.

The network load situation is taken into account with the aid of the unit 13 for network observation 13a, for optimization 13b and for machine parameter readjustment 13c. For this purpose, the network voltage $U_N$ is assessed at the network connection point of the conditioning device, and the configuration of the simulation of the synchronous machine is varied during operation with the aim of optimum damping of oscillations in the power supply network 2 and optimum reaction of the simulation of the synchronous machine to certain network loading, in order to increase the transient short-circuit power of the power supply network 2. Continual adaptation of the parameters of the simulation of the synchronous machine also makes it possible to react to changes in the network characteristic values resulting from switching processes or the influence of dominant loads. The transient d reactance and the sub-transient d and q reactances, and therefore different decay time constants in the stator current following a reaction of the synchronous machine simulation to sudden network loads can be adjusted via the elements of the flux coupling matrix and the d-q impedances of the stator, exciter and damper circuits of the synchronous machine simulation. In addition, the mechanical system of the synchronous machine simulation is freely configurable, which means that the natural mechanical frequency of the virtual machine can be varied by the mass moment of inertia of the rotor.

The conditioning device is able to substitute for conventional synchronous generators by using the P-f and U-Q droop function, with the power supply network being used to support the remote power and wattless-component demand. The P-f and U-Q droop factors are characteristics which describe the relationship between the power P and the frequency f, and that between the wattless component Q and the voltage U. It is also feasible for regulators to provide primary regulation to be superimposed on the synchronous machine model, as a result of which the conditioning device acts selectively with a natural characteristic or a linearized characteristic when a remote power demand occurs.

Together with the damper characteristics, possible primary regulation such as this results in a positive influence on the network, as is known from conventional power stations, on a small scale, whose effect extends throughout the network when a corresponding number of conditioning devices with simulated synchronous machines are physically distributed there.

Any oscillation tendency or voltage dips can be counteracted, using the optimum algorithm 13b, by analysis of the network behavior at the coupling point and by determination of machine model parameters.

Figure 5:
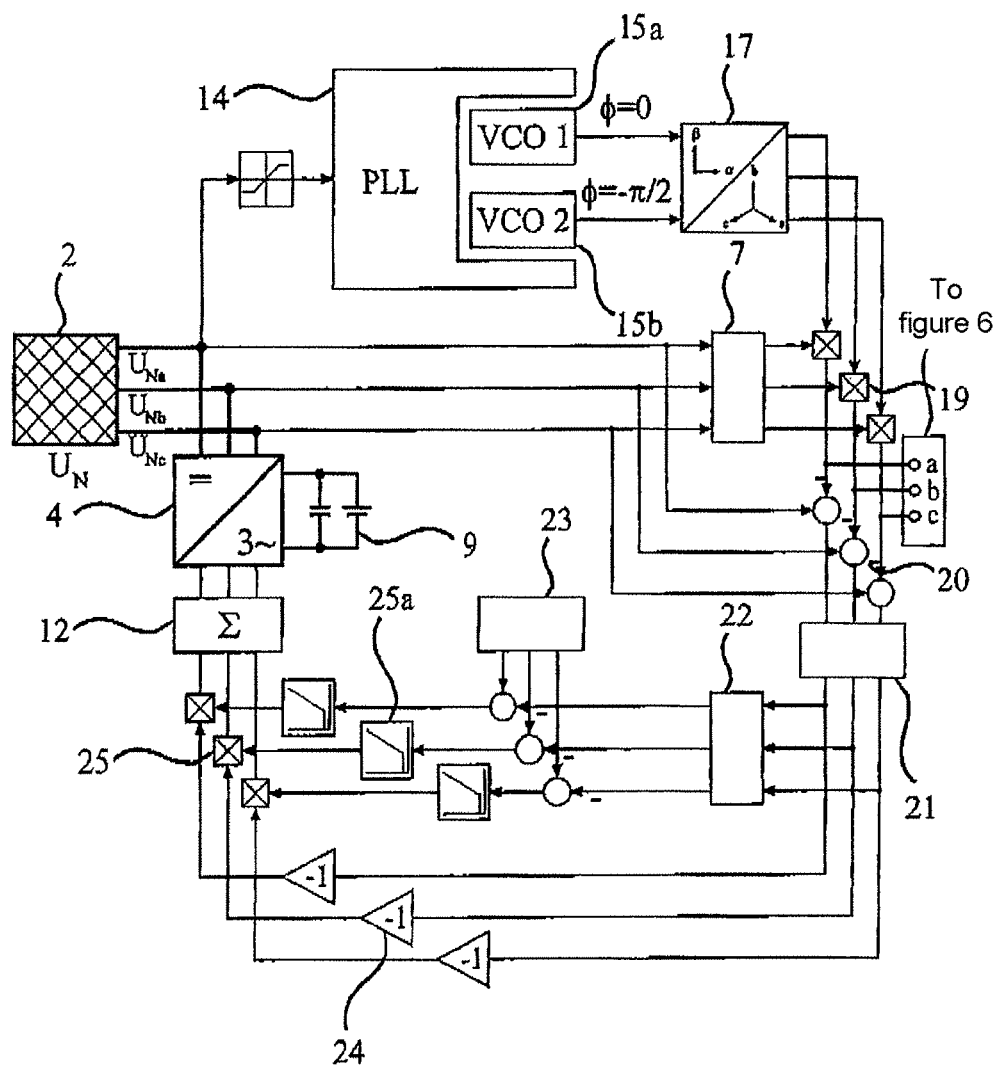
FIG. 5 shows a block diagram of the functional unit for compensation for harmonics.

FIG. 5 shows a block diagram of the functional unit for harmonic compensation 7 for the conditioning device. An upper voltage compensation set value $K_O$ is produced in order to generate a corresponding component of the conditioning current $I_K$ in the inverter 4, as a function of the three-phase network voltage $U_N$ ($U_{Na}$, $U_{Nb}$, $U_{Nc}$).

One phase of the network voltage is supplied to a phase locked loop (PLL) 14 with two readjusted voltage-controlled oscillators 15a, 15b in order to produce the angle reference for phase 1 of the network voltage $U_N$. An orthogonal alpha-beta system is formed by the readjustment of the two additional voltage-controlled oscillators ($VCO_1$, $VCO_2$) 15a, 15b which have a fundamental angle shift between them of $\Phi=-\pi/2$. A normalized three-phase auxiliary system, in the correct phase with respect to the network voltage $U_N$, is made available by subsequent α-β to a-b-c transformation 17 and is readjusted by a root-mean-value function 7 in the amplitude of the network voltage $U_N$. The sliding network voltage root-mean-square value is formed separately for each phase using the root-mean-square value function 7, and the three-phase auxiliary system, which was previously produced by the phase locked loop PLL, is amplitude-weighted by multiplication.

In order to determine the separate phase distortion components of the network voltage, the correct-amplitude and correct-phase auxiliary signal which can be tapped off after the multipliers 19 is subtracted from the network voltage instantaneous signals by subtraction 20. The signals which represent the distortion components in the network voltage can be tapped off downstream from the subtraction points 20.

After using a filter 21 to filter out fundamental-frequency components, the sliding root-mean-square value of the distortion component of each phase of the network voltage is determined using a root-mean-square value function 22. These actual distortion signals are supplied to the distortion regulators 25a, with the regulation being carried out separately for each phase.

After high-pass filtering, the signals are inverted, separately for each phase, in the phase inverters 24. The compensation signals obtained by phase inversion are supplied via multipliers 25, to a current superimposition device 12, which includes the current set values of the machine simulation and the unbalance compensation. The harmonic compensation signal which is produced downstream from the phase inverters 24 is previously amplitude-weighted by the multiplications 25 by the output signal from the distortion regulators 25a. The amplitude weighting by the distortion regulators 25a amplifies or attenuates the compensation signals produced downstream from the phase inverters 24 until the residual distortion value, as predetermined by the set-value block 23, of the network voltage is regulated.

Figure 6:
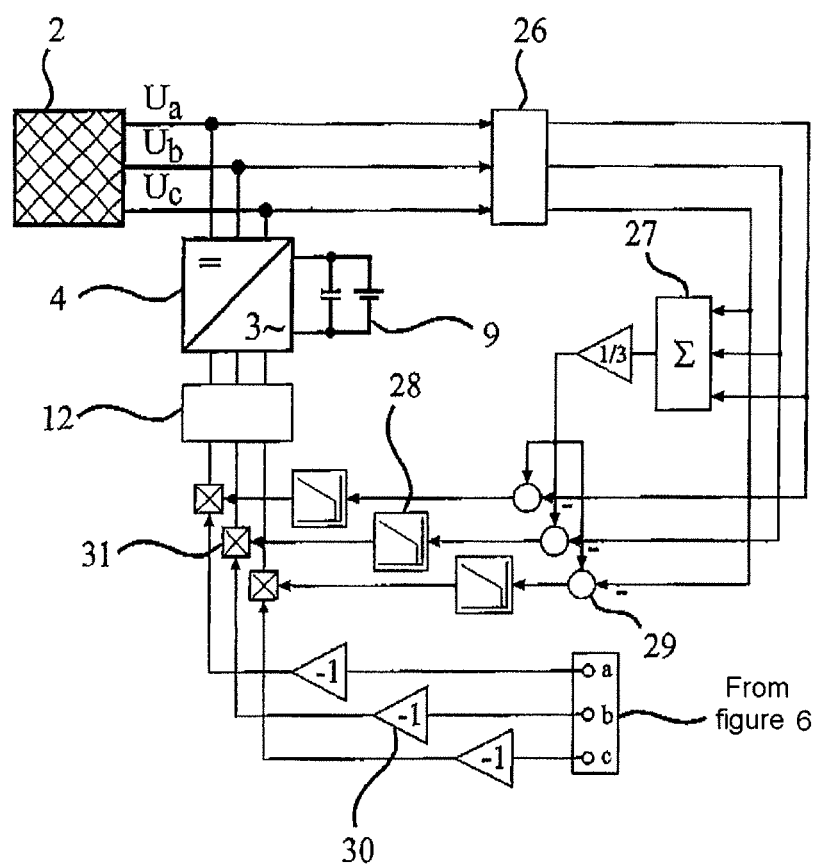
FIG. 6 shows a block diagram of the functional unit for compensation for unbalances.

The auxiliary signal, with the correct amplitude and phase with respect to the network voltage, which can be tapped off downstream from the multipliers 19 in FIG. 5, is passed on for additional use to the unbalance compensation stage, in FIG. 6.

FIG. 6 shows a block diagram of the functional unit for unbalance compensation 8. After using a root-mean-square value functional unit 26 to determine the sliding network voltage root-mean-square value separately for each phase, the arithmetic mean of the network voltage root-mean-square values is determined by an averaging unit 27. The extent of unbalance is then calculated as the difference between the common network voltage mean value and the determined sliding network voltage root-mean-square values for each phase, and is in each case supplied to an unbalance regulator 28. Subtractors 29 are provided for the subtraction process.

The auxiliary signal, which is obtained in the device for harmonic compensation 7 and has the correct amplitude and phase with respect to the network voltage, in the a-b-c coordinate system is used as a compensation signal to recreate the balance. These signals are each phase-inverted, by a respective phase inverter 31, for each phase. This phase-inverted auxiliary signal is amplitude-weighted separately for each phase by multipliers 31, with the respective output of the unbalance regulator 28.

The unbalance compensation signal is therefore available in a corresponding manner proportional to a manipulated variable as a component of the set value of the inverter 4, and is superimposed on the further current set-value signals for harmonic compensation and for the synchronous machine simulation.

The superimposition of the current set-value signals of the three functional units of the conditioner is possible since changes in the action of the harmonic and unbalance compensation functions after the occurrence of a disturbance take place in the form of the discrepancy between the network voltage profile and the ideal sinusoidal shape after different time intervals have passed. The first time window in the area from zero to a few hundred milliseconds is reserved for the influence of the synchronous machine simulation, depending on the configuration. This means that transient and sub-transient reactions of the synchronous machine simulation act on the network immediately. Because of the delayed effect of the root-mean-square value measurement points in the harmonic and unbalance compensation functions, the regulator action of these subsystems after the occurrence of a disturbance in the network voltage profile or an unbalance occurs with a time offset after the reaction of the synchronous machine simulation.

The invention claimed is:

1. A conditioning device, which is not a synchronous machine, for power supply networks comprising:
a network voltage measurement unit connected to a three-phase power supply network;
a computation unit connected to the network voltage measurement unit, said computation unit determines conditioning current values (K);
an inverter connected to a power supply network which feeds in conditioning currents ($I_K$) as a function of determined conditioning current values (K) from said computation unit, wherein the computation unit is configured to perform a modeled simulation of a synchronous machine with an implemented linear differential equation system with adaptable linear factors to vary characteristics of the modeled synchronous machine and to provide at least one component ($K_S$) of the conditioning current values (K) as stator currents of the modeled synchronous machine as a function of freely variable synchronous machine parameters; and a network observation unit configured to readjust, during operation, said freely variable synchronous machine parameters in response to changes of network voltages to provide a reaction of the modeled simulation of the synchronous machine to an actual network-load situation using network voltages ($U_N$) of the power supply network as input variables.

2. The conditioning device as claimed in claim 1, wherein the computation unit simulates the magnetically linear and electrically excited synchronous machine, which has a stator, an exciter and a damper, with the aid of a complete differential equation system including a configurable matrix of the linear factors of the differential equation system to describe the impedances of the stator, and a flux coupling between the stator, the exciter and the damper of the modeled synchronous machine.

3. The conditioning device as claimed in claim 1, wherein the computation unit simulates the synchronous machine with the aid of the synchronous machine model, and also takes account of the mechanical system to simulate the rotating mass of the rotor of the modeled synchronous machine.

4. The conditioning device as claimed in claim 1, wherein the computation unit determines network voltage harmonics of the measured network voltage and generates harmonic compensation current values ($K_O$) as a component of the conditioning current values (K) for compensation of the determined voltage harmonics with compensation currents ($I_K$), which correspond to the harmonic compensation current values ($K_O$) being fed back into the power supply network.

5. The conditioning device as claimed in claim 1, wherein the computation unit determines network voltage unbalances of the measured network voltage ($U_N$) and generates unbalance compensation current values ($K_U$) as a component of the conditioning current values (K) in order to compensate for the determined network voltage unbalances with compensation currents ($I_K$), which correspond to the unbalance compensation current values ($K_U$) being fed back into the power supply network.

6. The conditioning device as claimed in claim 1, wherein said inverter connected to the power supply network via a coupling inductance or a coupling transformer, and a DC voltage source connected to the inverter, with the inverter being driven by the conditioning current values (K) to carry out power conditioning in the power supply network.

* * * * *